April 27, 1954     E. G. DYEKJAER     2,676,595
VETERINARY SURGICAL KNIFE
Filed Jan. 21, 1953

Patented Apr. 27, 1954

2,676,595

UNITED STATES PATENT OFFICE 2,676,595

VETERINARY SURGICAL KNIFE

Elith Gerhard Dyekjaer, Grena, Denmark

Application January 21, 1953, Serial No. 332,330

4 Claims. (Cl. 128—305)

My invention relates to veterinary surgical knives and more particularly to surgical knives for making incisions in the annular muscle serving to close the milk passage in the teats of cows.

Some cows are "hard-milking" which may be due to the closing muscles of the teats being too tight or having become so as a result of damages to the teats. In order to redress the hard-milking due to tightness of the closing muscles, it has been proposed to weaken the closing muscle by cutting part of its fibres through.

The main object of my invention is to provide a knife which is particularly suited for performing this operation.

This knife consists essentially of a blade, which is somewhat tapered at one end and has blunt edges, in one of which a barb is developed having a cutting edge on the inside, the point of the barb curving inwards. If desired, both edges of the V-shaped incision forming the barb may be sharpened, in order to reduce the effort which is necessary for effecting a cut with the knife.

In the following, a detailed description of a preferred embodiment of my improved surgical knife and its mode of operation will be given with reference to the accompanying drawing, but I wish it to be understood, that various changes may be effected without departing in any manner from the spirit of my invention.

Figure 1:
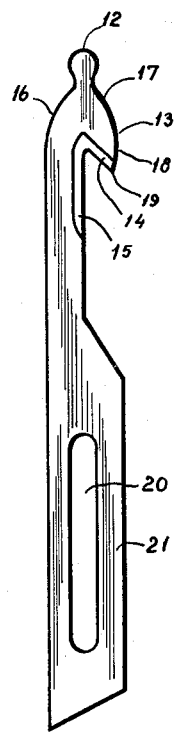
Figure 2:
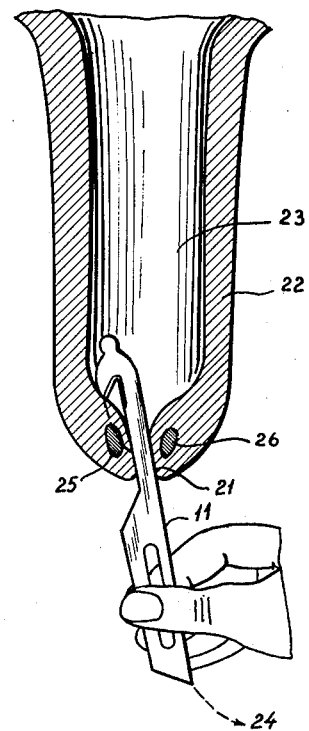

Figure 1 shows an elevation of the knife, and Figure 2 shows a longitudinal section of a teat with the knife in position for use.

In the drawings 11 represents the knife having at its tapered end a button 12 and a barb 13. The inside of the barb is provided with a cutting edge 14 and a cutting edge 15 is also provided opposite to the cutting edge 14, the two edges together having the shape of a V. The outer edges 16 and 17 of the knife 11 are blunt, and the outside 18 of the barb 13 is arcuated, so that the point 19 of the barb is pointing inwards towards the longitudinal axis of the knife.

The knife is preferably made from hardened steel as a blade to be fixed in a handle, any suitable means, such as a slot 20 being provided to facilitate the fixing. Thus, the knife can be parted from the handle for sterilizing purposes, or exchanged for a new one when blunted.

Figure 2 illustrates the use of the knife. It is inserted so far through the milk passage 21 of a teat 22 that the part comprising the barb has passed into the milk chamber 23. The knife is then withdrawn with an arcuated movement as illustrated by the arrow 24. Thereby, the cutting edge performs curved incisions, as shown by the dotted line 25, ending in the milk passage and cutting through part of the closing muscle 26.

Due to the button 12 and blunt edges 16 and 17, no cut will be made when the knife is inserted. On withdrawing, the arcuated blunt outside 18 of the barb will act like a wedge, trying to push aside the tissue, thereby assisting in making the incision curved, so that it may terminate in the milk passage. This is of importance since thereby the incision is protected against infections from the outside of the teat.

I claim:

1. A veterinary surgical knife in the shape of a blade, which is tapered at one end and has blunt edges, in one of which a barb is developed, having a cutting edge on the inside, the point of the barb curving inwards.

2. A veterinary surgical knife as set forth in claim 1, in which both edges of the V-shaped incision forming the barb are cutting edges.

3. A veterinary surgical knife, made from hardened steel and comprising a blade with blunt edges and tapered at one end, the tapering being terminated by a button; a V-formed incision in one of the blunt edges near the tapered end having sharpened cutting edges and forming a barb the point of which is curved inwards.

4. A veterinary surgical knife as set forth in claim 3, comprising means for securing the knife to a handle.

References Cited in the file of this patent

UNITED STATES PATENTS

| Number | Name | Date |
|---|---|---|
| 123,497 | McCarraher | Feb. 6, 1872 |
| 1,843,223 | Hasseler | Feb. 2, 1932 |